May 21, 1946.  G. W. WOLCOTT  2,400,861

RELIEF VALVE

Filed Jan. 30, 1943

Glenn W. Wolcott INVENTOR.

BY C. B. Stevens ATTORNEY.

Patented May 21, 1946

2,400,861

UNITED STATES PATENT OFFICE 2,400,861

RELIEF VALVE

Glenn W. Wolcott, Dayton, Ohio, assignor to United Aircraft Products, Inc., Dayton, Ohio, a corporation of Ohio Application January 30, 1943, Serial No. 474,141

1 Claim. (Cl. 137—53)

This invention relates to a relief valve to permit by-pass or escape of fluid when the pressure thereof exceeds a predetermined value, and has particular reference to a relief valve which is especially designed for use in pumps such, for example, as the hand pumps employed in the fuel feeding systems of aircraft. The same is not, however, limited to this use, but may be used in various other instances where a relief valve is necessary or desirable.

One well known prior type of relief valve over which the instant valve is a decided improvement and which the instant valve is designed to supplant or replace, is characterized by the inclusion of a shield or seal of the bellows type to prevent leakage of gasoline or other liquid or fluid around the stem of the valve. It has been found in practice, however, that a relief valve employing a shield or seal of the bellows type is subject, in many instances, to severe chattering, disalinement and leakage due to constant flexing of the bellows shield.

Accordingly, one special and important object of the present invention is to provide a relief valve which may readily be employed to supplant or replace a relief valve of the prior objectionable bellows shield or seal type and which avoids the principal disadvantages of said prior type of valve. In other words it is one of the special and important objects of the present invention to provide a relief valve including a sealing means which, in addition to performing effectively its sealing function, serves effectively as a damping means to avoid vibration and chattering of the valve while offering only inconsequential resistance to opening movements of the valve.

Another special and important object of the present invention is to provide a relief valve in which the sealing means exerts its damping action uniformly upon the valve in all positions of the latter.

Another special and important object of the present invention is to provide a relief valve in which the valve element thereof is maintained positively in axial alinement with its seat.

Another special and important object of the invention is to provide a relief valve embodying a construction such that it may readily be employed to replace relief valves of the prior bellows seal type mentioned without changes in the pumps or the like in which said prior valves are used.

Another special and important object of the invention is to provide a relief valve which is of simple construction, which is easy to produce and of comparatively low production cost, and which is thoroughly reliable and efficient in use.

With the foregoing and other objects in view, which will become more fully apparent as the invention is better understood, the same consists in a relief valve embodying the novel features of construction, combination and arrangement of parts as will be hereinafter more fully described, illustrated in the accompanying drawing and defined in the appended claims.

In the accompanying drawing, wherein like characters of reference denote corresponding parts in the different views.

Figure 1:
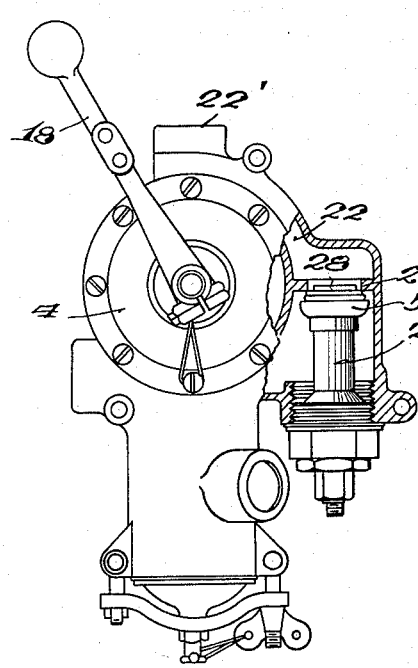
Figure 1 is a view, partly in side elevation and partly in section, of a hand-pump, such as is used in the fuel feeding system of an aircraft, equipped with a relief valve constructed in accordance with the present invention.
Figure 2:
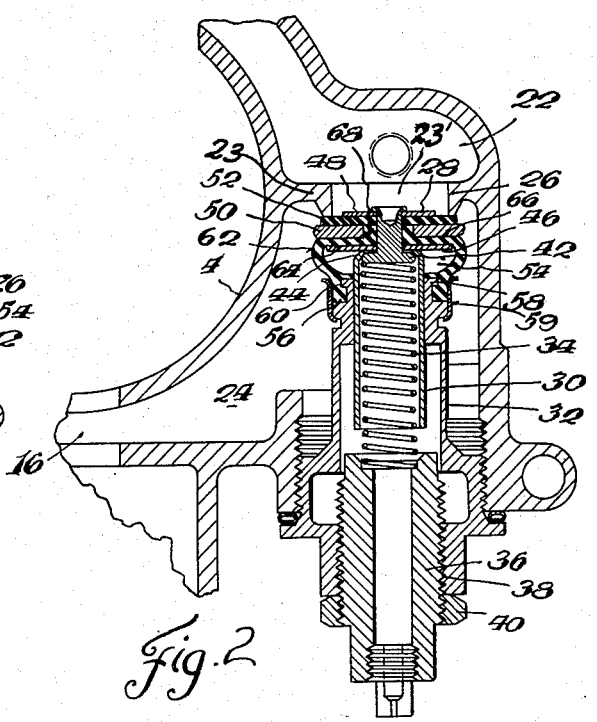
Figure 2 is an enlarged longitudinal section through the valve and a portion of the hand-pump.
Figure 3:
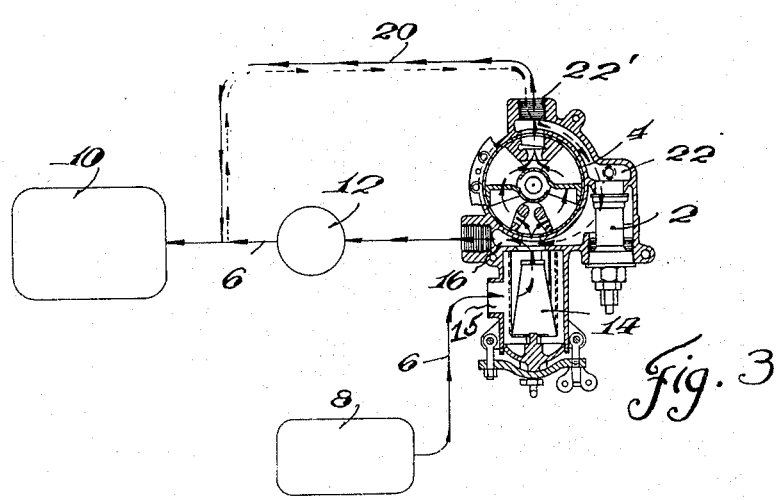
Figure 3 is a diagrammatic view of a fuel feeding system including a hand-pump and valve as shown in Figures 1 and 2, the pump being shown in vertical section.

Referring to the drawing in detail, it will be observed that the present relief valve, designated generally as 2, is illustrated by way of example as being embodied in a hand-pump of the double-acting oscillating type, designated generally as 4, comprising part of a system for feeding fuel from a fuel tank, designated at 8, to an internal combustion engine designated as 10.

In the casing of the pump 4 at the inlet side thereof is a by-pass passageway 16 comprising part of a main fuel line 6 which connects the fuel tank 8 with the inlet 15 of said pump and the engine 10, while interposed in said main fuel line, between the pump 4 and the engine 10, is a power-driven pump 12 for feeding fuel to the engine 10. Preferably, but not necessarily, the main fuel line 6 also has interposed therein, between the hand-pump 4 and the fuel tank 8, a strainer 14.

Connecting the outlet 22' of the hand pump 4 with the engine 10, either directly or through the portion of the main fuel line 6 which extends between the power-driven pump 12 and the engine, is a combined fuel feed and fuel return line 20, while formed in the casing of the hand-pump 4 is a second by-pass passageway which connects the outlet 22' of said pump with the inlet 15 and the by-pass passageway 16 thereof and which comprises the two portions, designated as 22 and 24, which are separated by a partition 23 and which are disposed between said partition and the outlet and the inlet of said pump, respectively.

In the partition 23 is a port 23' which affords communication between the passageway portions 22, 24 under the control of the relief valve 2, which valve is mounted in the passageway portion 24 and closes toward the outlet and opens toward the inlet of the hand-pump 4 and is yieldably biased toward closed position, being maintained closed normally under a predetermined force so as to open when the pressure of the fuel in the passageway portion 22 exceeds a predetermined value.

During normal operation of the system, the power-driven pump 12 operates to draw fuel from the tank 8 and deliver it to the engine 10 through the main fuel line 6 in by-passing relationship to the hand-pump 4. However, when starting the engine 10, or upon failure of the power-driven pump 12, or at other times, it may be necessary or desirable to employ the hand-pump 4 to feed fuel to the engine, in which event the path of flow of the fuel is from the tank 8, through the pump 4 and to the engine via the feed line 20 in by-passing relationship to the power-driven pump 12.

At times the pump 12 may deliver more fuel than is required by the engine 10. In that event, the pressure of the fuel in the line 20 rises until it is sufficiently high to open the relief valve 2, whereupon the excess fuel simply is circulated in a closed path from the pump 12, through the line 20 and the by-pass passages 22, 24 and 16 back to said pump 12. Likewise, the pump 4 may, at times, deliver more fuel than is needed by the engine 10, in which event the pressure of the pumped fuel rises until the relief valve 2 is forced open and the excess fuel then simply is circulated from the outlet to the inlet of said pump 4 via the passageway 22, 24.

The relief valve 2 comprises, generally speaking, a casing 32, a stem 30 mounted in said casing and guided by the same for longitudinal sliding movement, and a head 28 carried by said stem for cooperation with a seat 26 carried by the partition 23 in surrounding relationship to the port 23' therein.

The casing 32 is suitably mounted, as by being threaded in a wall of the pump 4, to insure axial alinement of the stem 30 and the head 28 with the port 23' and the valve seat 26, and said casing, adjacent to its inner end, is provided with an exterior, annular groove 56 in which is tightly engaged an inwardly extending annular flange 60 at one end of a hollow, bulbous element 54 formed from rubber, synthetic rubber or other suitable resilient material which is unaffected by gasoline, oil or other liquid or fluid which may contact therewith. To secure the said end of said bulbous element 54 fluid-tightly in embracing relationship to the inner end of the casing 32 the same is surrounded by a clamping band 59 which is retained in place by having one end thereof spun or bent inwardly into an external annular groove 61 in the said inner end portion of said casing 32.

From its end which is secured to the inner end of the casing 32 the bulbous element 54 is flared or extends outwardly and beyond the said inner end of said casing 32 to its rounded portion 62 of greatest diameter and then is directed inwardly in flat, disk-like form, to a central point where it is provided with a central, outwardly extending boss 68 and with a central opening extending through said boss.

Disposed against the inner and the outer faces 64 and 66 of the disk-like, outer end wall 64 of the bulbous element 54 are reinforcing or stiffening disks 46 and 50, respectively, of metal or other suitable stiff material, the latter of which has a central opening snugly receiving the boss 68, while disposed against the outer face of the disk 50 is a disk 52 of rubber, synthetic rubber or other suitable yieldable material which is unaffected by gasoline, oil or the like and which is directly engageable with the valve seat 26 to close the port 23'. Against the outer face of this disk 52 is disposed a disk or washer 48 of metal or other suitable stiff material which is of amply smaller diameter than the disk 50 so as not to interfere with seating of said disk 52 against the valve seat 26.

The stem 30 is hollow and, at its end adjacent to the valve head 28 is flanged inwardly and engaged against the disk 46 and also provided with a central opening which is alined with the central opening in the boss 68 and with central openings in disk 52 and the disk or washer 48. Moreover, a rivet 42 has its head disposed in the stem 30 against the inwardly flanged end thereof and its shank extending through said central openings and spread against the outer face of the disk or washer 48, whereby the stem 30 is rigidly secured to the head 28 in unitary assembly therewith. The component parts of the latter are securely clamped together in unitary assembly and the bulbous element 54 is tightly sealed at its outer end against any possibility of leakage of fuel into the same.

Within the stem 30 is an expansion coil spring 34 one end of which seats against the head of the rivet 42 and the other end of which seats against a plug 36 threaded in the outer end portion of the casing 32. Said spring 34 thus tends constantly to urge the valve head 28 outwardly relative to said casing and to maintain the disk 52 of said head seated against the valve seat 26 in closing relationship to the port 23'. In this connection as is obvious, by threading the plug 36 inwardly or outwardly relative to the casing 32, the power of the spring 34 may be varied to predetermine the excess pressure of the fuel required to open the valve. A nut 40 threaded on the plug 36 is engageable with the casing 32 to lock said plug in any desired adjusted position.

The bulbous element 54 not only serves to prevent any leakage of fuel from the passageway 22, 24 through the casing 32, but, by its resistance to tilting of the valve head, cooperates with the stem 30 to insure flat and uniform seating of said head upon the seat 26. It also serves, because of its tension counter to the force exerted upon the valve by the spring 34 when the valve is open, effectively to hold the valve against any fluttering or chattering.

Without further description it is thought that the construction and operation of the present relief valve will be clearly understood and its advantages appreciated. It is desired to point out, however, that while only a single, specific structural form of the same has been illustrated and described, the same is readily capable of embodiment as various other specifically different structural forms within its spirit and scope as defined in the appended claim.

I claim:

A relief valve comprising a casing, a hollow stem slidably mounted in said casing for longitudinal movement and having an inwardly flanged end projecting beyond one end of said casing, a rivet including a head disposed within said stem against the inwardly flanged end thereof and a shank extending through and beyond said flanged end, a valve head including a stiff disk disposed against the outer face of the flanged end of said stem and through which said rivet shank extends, a bulbous member of resilient material enclosing the projecting end of said stem and including an inner end portion surrounding said end of said casing and secured fluid-tightly thereto and an outer end portion of disk-like form overlying said stiff disk, a central boss projecting outwardly from the outer end portion of said bulbous member in surrounding close-fitting fluid-tight relationship to the shank of said rivet, a second stiff disk disposed against the outer face of the disk-like outer end portion of said bulbous member in surrounding closely embracing relationship to said boss, a valve-seat-engaging disk of resilient material disposed against the outer face of said second mentioned stiff disk, a third stiff disk disposed against the outer face of said valve-seat-engaging disk, said third disk being of lesser diameter than said valve-seat-engaging disk to leave the marginal portion of the latter free for engagement with a valve seat, the free end portion of the shank of said rivet extending through said third disk and being headed thereagainst to secure said stem to said valve head and to clamp the parts of the latter together, and an expansion coil spring in said hollow stem constantly urging said stem and said valve head outwardly relative to said casing.

GLENN W. WOLCOTT.